United States Patent [19]

Plemons et al.

[11] 4,079,666

[45] Mar. 21, 1978

[54] APPARATUS FOR TREATING BAKED PRODUCTS IN ORDER TO IMPROVE THE SHELF LIFE THEREOF

[75] Inventors: Robert F. Plemons, Danville, Ill.; Charles H. Staff, Omaha, Nebr.; J. F. Ross Cameron, Costa Mesa, Calif.

[73] Assignee: Fairmont Foods Company, Culver City, Calif.

[21] Appl. No.: 690,936

[22] Filed: May 28, 1976

Related U.S. Application Data

[60] Division of Ser. No. 575,439, May 7, 1975, Pat. No. 3,979,525, which is a continuation-in-part of Ser. No. 353,698, Apr. 23, 1973, abandoned.

[51] Int. Cl.$^2$ .......................... A21B 5/00; A47J 37/00
[52] U.S. Cl. ........................................ 99/355; 99/386; 99/517; 426/302
[58] Field of Search ................ 99/517, 355, 386, 356; 426/310, 302, 307, 497, 128, 326, 327, 328, 335, 321, 323, 324, 532, 331, 549

[56] References Cited

U.S. PATENT DOCUMENTS

| 2,374,425 | 4/1945 | Weerth | 99/355 |
| 2,668,117 | 2/1954 | Bucci | 426/310 |
| 3,021,219 | 2/1962 | Melnick | 426/310 |
| 3,456,578 | 7/1969 | Pinsly | 99/355 |
| 3,528,362 | 9/1970 | Arnold | 99/355 |
| 3,718,082 | 2/1973 | Lipoma | 99/355 |

*Primary Examiner*—Robert W. Jenkins
*Attorney, Agent, or Firm*—Henry L. Brinks; John J. Pavlak

[57] ABSTRACT

A method and apparatus is provided for reducing mold spoilage of partially baked pizza crusts intended to be stored in unsealed packages at normal room or ambient temperatures. This method and apparatus comprises properly reducing the moisture content and water activity of the crusts, cooling the crusts to below ambient temperatures in a cooler having a spiral path, treating the surface of the crusts with ethyl alcohol, and packaging the crusts before significant amounts of alcohol can vaporize. The shelf life of partially baked pizza crusts so treated and stored in unsealed plastic packages at room temperatures can be extended to at least about 20 weeks or more as compared to about one week without such treatment.

4 Claims, 5 Drawing Figures

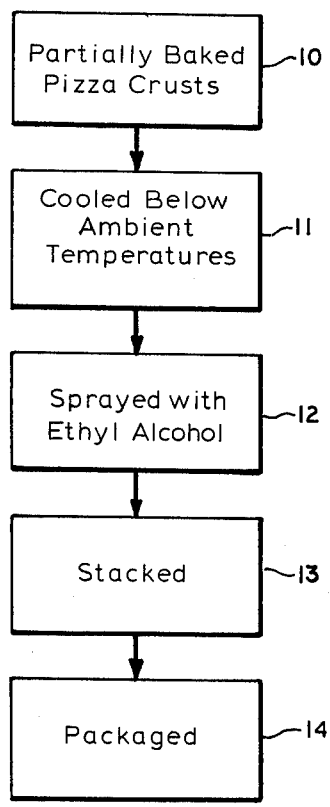
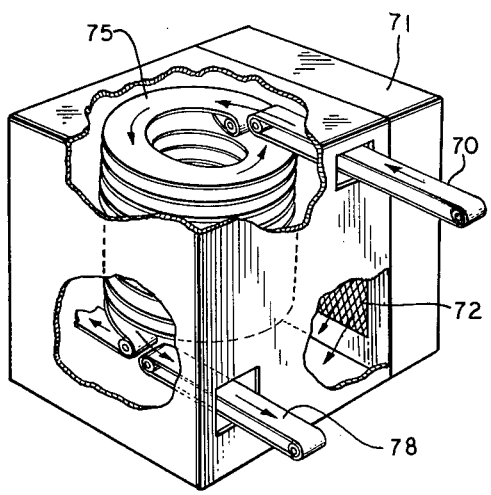
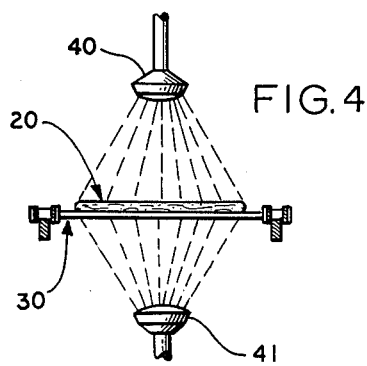
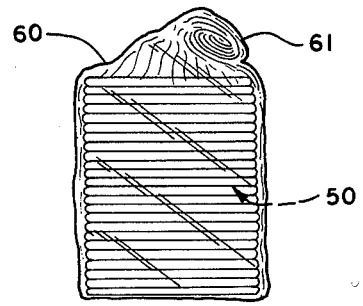
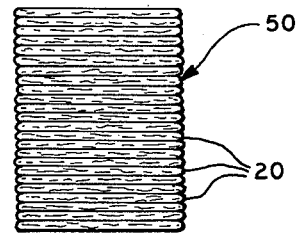

APPARATUS FOR TREATING BAKED PRODUCTS IN ORDER TO IMPROVE THE SHELF LIFE THEREOF

This application is a division of application Ser. No. 575,439, now U.S. Pat. No. 3,979,525, which in turn is a continuation-in-part of Ser. No. 353,698, filed Apr. 23, 1973, now abandoned.

BACKGROUND OF THE INVENTION

The present invention relates to retarding mold growth on baked products intended to be stored at ambient or refrigerated temperatures in either sealed or unsealed packages.

Pizza is a popular item in restaurants and pizzerias. These places, however, most often lack the facilities and/or labor for making the pizza crusts because they must be rolled out and prebaked before application of sauce and topping materials. For this reason, pizza crusts are often purchased from large manufacturers of crusts, partially baked, and the restaurants and the pizzerias subsequently apply sauce and topping materials, and then bake shortly before serving to the customer.

The crust manufacturers make partially baked pizza crusts in large volume, and then ship them to distributors, often over considerable distances, even by transcontinental shipping. The distributors then deliver the crusts to the restaurants and pizzerias. The partially baked pizza crusts are stored under refrigeration, both during shipping and in the restaurant prior to use, where the amount of refrigerated storage space is often severely limited.

Partially baked pizza crusts are subject to mold and yeast growth without continued refrigeration as a result of contamination by spores of mold and yeast contained in the atmosphere. Contamination can, and usually does, occur within the short time between the normal partial baking and packaging steps in the crust manufacturing process. Mold growth begins to appear within five to seven days after preparation of the partially baked pizza crusts, if kept unrefrigerated and at ambient or room temperatures, typically 70° to 80° F. Mold growth on the pizza crust renders it unsuitable for human consumption and means that the product must be destroyed.

While refrigeration retards mold and yeast growth, it is expensive and is not always convenient. Moreover, if refrigeration is lost, the pizza shells are susceptible to attack.

Hermetically sealed containers have been long recognized as a means for reducing the mold and yeast growth. However, hermetically sealed containers are expensive and impracticable. Moreover, when the seal is broken, as when the first pizza crust is removed, the remaining partially baked crusts in the package are exposed to atmospheric mold and yeast spores.

One current practice for handling and storing partially baked crust is to stack the crusts in a ventilated polyethylene bag, for example, in stacks containing about two dozen crusts, which are then placed in corrugated shipping containers. The entire package is then refrigerated at temperatures of 32° F to 40° F. However, even under these low temperatures (32° F to 40° F), the crusts may mold within 3 to 4 weeks.

It is highly desirable that the partially baked pizza crusts remain mold-free for a period of about eight weeks or longer, in order to allow time for shipping, inventory, and storage prior to use. For this reason, the current practice is to incorporate calcium propionate into the dough mix, after which the crusts are refrigerated (32° - 40° F). However, mold growth with propionate treated crusts will appear in 3 to 5 weeks, even when refrigerated. The mold growth with propionate treated crusts will appear in 3 to 7 days, if non-refrigerated and maintained at ambient temperatures.

Various known preservatives commonly applied in the baking and food industry (for example, sodium propionate) have been used within legal and normally acceptable limits in efforts to extend the refrigerated shelf life of partially baked pizza crusts, but have met with only limited success.

Although mold and yeast growth are ordinarily referred to collectively, the spoilage in partially baked pizza crusts is due primarily to germination of mold spores.

Ethyl alcohol has been used an an anti-bacterial agent in and for certain foods. It has also been taught as being useful in controlling the germination of mold spores in certain kinds of perishable foods in conjunction with hermetically sealed packages and usually in conjunction with continuous refrigeration. However, ethyl alcohol has not been taught as being useful for retarding and preventing the germination of mold spores in partially baked food products, such as pizza crusts, especially where non-refrigerated, ambient temperature storage conditions are employed or when unsealed packaging materials are used.

SUMMARY OF THE INVENTION

The present invention relates to an apparatus for increasing the shelf life of partially baked pizza crusts stored in unsealed or sealed packages at normal room or ambient, or refrigerated temperatures and in particular to retarding the growth of viable mold spores on the surface of the partially baked pizza crusts. This is accomplished without the necessity for refrigerated storage or hermetically sealed packages heretofor believed to be required to accomplish the above purposes and particularly the retardation of mold growth.

This increased shelf life and the retardation in the growth of viable mold spores on the surface of the partially baked pizza crusts is accomplished by: (a) partially baking the pizza crusts at a temperature and for a time sufficient to reduce the moisture content of the pizza crusts to between 25% and 50% by weight, preferably between 30 and 40% by weight, and to reduce the water activity (Aw) of the pizza crusts to not greater than 0.96, preferably not greater than 0.94 or 0.95; (b) cooling the partially baked pizza crusts to a temperature below ambient, about 75°-80° F, and preferably not more than 72° F; (c) treating at least substantially the entire surface of the cooled, partially baked pizza crusts, which are contaminated on at least some surfaces thereof with viable mold spores, with from 0.001 to 0.02 ml of ethyl alcohol per sq cm of crust surface, advantageously with only from 0.002 to 0.006 ml of alcohol per sq cm of surface; and (d) packaging the alcohol treated, partially baked pizza crusts, preferably in an unsealed plastic container, within such a period of time following the ethyl alcohol treatment that vaporization of any significant amount of alcohol prior to packaging is avoided.

In a preferred embodiment of this invention, the ethyl alcohol is applied to the surface of the partially baked pizza crusts by spraying the top and bottom surfaces of the crusts while they are being conveyed horizontally.

In another preferred embodiment, a plurality of alcohol treated, partially baked pizza crusts, generally from 10 to 30 crusts and preferably from 20 to 24 crusts, are stacked one on top of the other, before packaging, with the flat sides of the crusts in direct contact with each other.

Partially baked pizza crusts treated according to the apparatus set forth hereinabove remain free from spoilage due to mold growth at normal room or ambient temperatures for a period of at least about eight weeks without using either refrigeration or hermetic packaging. Such partially baked pizza crusts can be stored at normal room or ambient temperatures in unsealed packages for as long as about 20 weeks without significant spoilage due to mold growth. This surprisingly increased shelf life permits a manufacture of partially baked pizza crusts to make the crusts in large volumes at one or more locations from which the crusts can be distributed long distances, as by transcontinental shipping, to restaurants, pizzerias, and the like, without spoilage. Furthermore, the method described herein will meet accepted legal and industrial standards without substantial increases in costs.

The objects and advantages of the present invention will become even more apparent from the following description, appended drawing, and the attached claims.

BRIEF DESCRIPTION OF THE DRAWING

FIG. 1 is a flow diagram illustrating the processing of partially baked pizza crusts in accordance with the present invention.

FIG. 3 is an elevational view illustrating an apparatus for cooling the pizza crusts prior to treatment with alcohol.

FIG. 4 is a diagrammatic view illustrating a preferred method of treating individual pizza crusts with alcohol according to the process of the present invention.

FIG. 5 is a diagrammatic view illustrating a stack of pizza crusts which have been individually treated according to the present invention.

FIG. 6 is a diagrammatic view illustrating a stack of pizza crusts contained in an unsealed polyethylene bag.

DESCRIPITION OF THE PREFERRED EMBODIMENTS OF THE INVENTION

Figure 2:
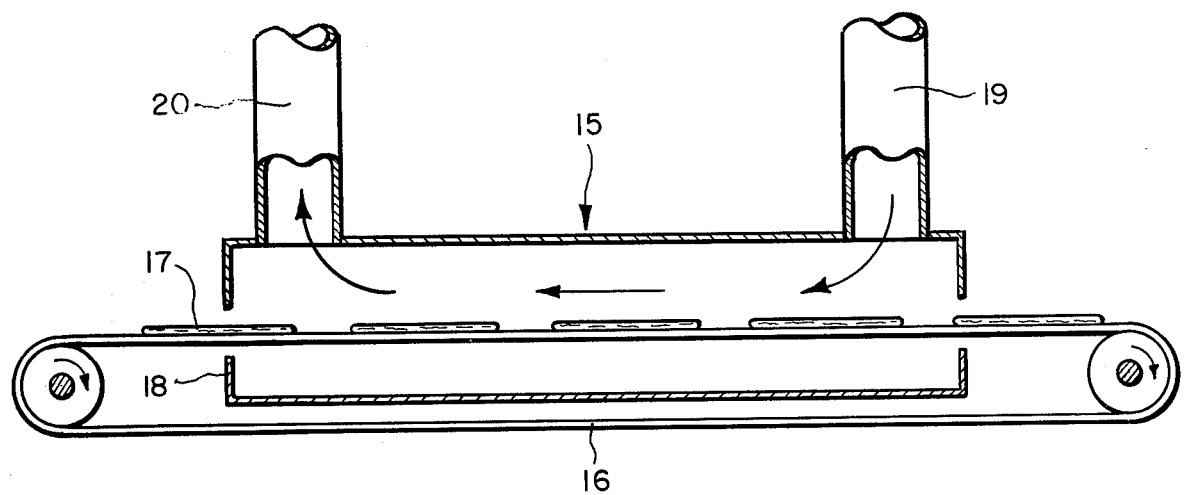
FIG. 2 is a diagramatic view of a conventional baking oven for partially baking pizza crust.

Pizza dough is made by well-known techniques combining water, flour, vegetable oil, sodium bicarbonate, sodium aluminum phosphate, and yeast together with flavoring agents, such as salt, in a mixer. According to one process, the dough is divided into separate pieces by a divider which are then shaped into balls by a rounder. The dough balls are next allowed to rise in a proofer and flattened into pizza shells by a stamper apparatus. According to another process, the dough is spread into a flat sheet and the shells are formed by passing the sheet under a cylindrical cutter.

Unbaked pizza dough typically has a moisture content in the range of about 50% to 60%, based on the total weight of the crust. Also, unbaked pizza dough typically has a water activity (Aw) of 0.97 or higher. The water activity (Aw) is the measure of the amount of free water present in a multicomponent system. In the present type of system it is expressed as the ratio of the water in the food to the vapor pressure of pure water at the given temperature.

One method of measuring the Aw is with an electric hygrometer indicator which employs a sensor which measures the relative humidity. The moisture content is determined by the weight difference before and after a sample has been heated in an oven at a temperature of at least 110° C.

After the pizza shells have been made and shaped, they are partially baked in an oven in order to reduce both the moisture content and the water activity (Aw) to acceptable levels. The acceptable level for the moisture content of the partially baked pizza crusts is from about 25% to about 50% by weight, although preferably the moisture content is between 30 to 40% by weight and is most preferably in the range of from about 30% to about 35% by weight. The acceptable level for the Aw is from about 0.70 to not more than 0.96. Preferably, the Aw is between 0.90 and 0.95 and most preferably between 0.92 and 0.94. Typical partial baking conditions will include a final bake between about 500° F and 550° F for about 3 to 4 minutes.

Inasmuch as the partially baked pizza crusts have the high moisture contents recited above and also large surface areas, they are highly susceptible to spoilage by mold and yeast. Although spoilage by bacteria is substantially eliminated by baking the crusts to the aforesaid conditions, the pizza crusts are contaminated with viable mold spores almost immediately after the heating step. Thus, although mold spores may be destroyed during the heating step, the crusts are recontaminated with viable mold spores prior to packaging. The mold spores ordinarily germinate, grow and spoil the product within a short period of time. The surfaces of the partially baked pizza crust after the partial baking step therefore show spoilage resulting primarily from mold growth, rather than from any significant bacterial growth.

Referring now to the drawing, FIG. 1 is a flow sheet illustrating the steps included in the process of the present invention. The partial baking step discussed above is indicated at 10. The pizza crusts are at least partially baked at 10 for a time and at temperatures which will reduce both the moisture content and the Aw level of the crusts to acceptable levels. The baking operation may be performed by passing the pizza crust through a conventional baking oven 15 as illustrated in FIG. 2, although other baking ovens may be used. According to one well-known apparatus, a conveyor belt 16 carries the crusts 17 through a forced air heating chamber 18 fitted with a hot air duct 19 and exhaust duct 20.

According to conventional practice, the pizza crusts would be packaged after a partial baking step in a plant in ambient temperatures in the range from about 85° F to 90° F. However, according to the present invention, the crusts are cooled, as indicated at 11, to temperatures below ambient, about 75° F – 80° F. Advantageously, the temperature of the crusts is reduced to a range of from 68° F to about 72° F. Reducing the temperature of the partially baked pizza crusts even further to between 50° F and 60° F is also advantageous. Although some benefits are achieved by alcohol application to crusts at higher temperatures, an unexpectedly longer shelf-life for the partially baked pizza crusts is achieved by first cooling below ambient temperatures.

Various cooling techniques may be used. Referring to FIG. 3 there is shown a technique for reducing the temperature of the partially baked pizza crusts prior to alcohol application. The pizza crusts are fed by conveyor 70 to a cooling chamber 71 through which passes a forced draft of cooled air as indicated at 72. The pizza crusts are transferred in the chamber 71 to conveyor 75 which conducts the crusts through a spiral path downwardly as indicated by arrows, and then transfers the crusts to a discharge conveyor 78 from which the crusts emerge from the chamber 71.

After cooling, ethyl alcohol is applied to substantially the entire surface of the partially baked pizza crusts as indicated at 12. Preferably all surfaces of the crusts are treated with the ethyl alcohol. Although the ethyl alcohol may be applied to the surfaces by many techniques, spraying is preferred.

Referring to FIG. 4, there is illustrated a preferred method for applying ethyl alcohol to the partially baked pizza crusts. The crusts are moved on a wire-mesh conveyor belt 30 between upper and lower spray nozzles, 40 and 41, which direct fan-shaped alcohol sprays to the bottom and top surfaces of such pizza crusts, respectively. The alcohol sprays are sufficiently wide so as to also apply alcohol to the edges of the pizza crusts, as well as the top and bottom surfaces, so that the alcohol is applied to substantially the entire surface of each pizza crust. The wire-mesh belt being perforate admits alcohol spray to the bottom surface of the crusts from the nozzle 41.

As demonstrated in the Examples hereinafter, it is important that the temperatures of the pizza crusts during alcohol application be below ambient temperatures, for example, below about 75° F – 80° F, and advantageously below about 72° F. The lower limits of temperatures of the crusts during alcohol application are determined primarily by expense due to the lesser amounts of alcohol required, and, in any event, the temperatures of the crusts need not be below freezing temperature of the crusts, about 32° F.

The alcohol employed in the spray should be at a temperature not greater than ambient and is preferably at a temperature equal to or below the temperature of the pizza crusts to which it is applied.

The ethyl alcohol may be either denatured or undenatured. Successful results have been achieved with undenatured 85% to 95% ethyl alcohol. Denatured ethyl alcohols which are satisfactory for food usage, and which are substantially completely volatile at or below the final baking temperatures (about 450° F) so that they are removed during baking, also can be used. Solutions containing ethyl alcohol and large amount of water should be avoided as they add water to the surface and can result in more favorable growth mediums for molds, yeasts and bacteria.

The amount of ethyl alcohol that must be applied to the cooled surfaces of the partially baked pizza crusts is at least about 0.001 ml per sq cm, about 0.0008 g per sq cm, of crust surface area. At preferred application temperatures, this results in a weight gain of about 0.5% by weight for a typical partially baked pizza crust weighing about 235 g. The upper limit of the amount of alcohol application is about 0.02 ml per sq centimeter of the pizza crust surface, which appears to be the point of saturation of the crust surface. Application of alcohol in higher amounts adversely affects the texture of the crusts; the crusts tend to become fragile and fall apart with higher amounts of alcohol.

Advantageously, the amount of ethyl alcohol applied to the surfaces of the partially baked pizza crusts should be between 0.002 and 0.006 ml per sq cm of crust surface. Preferably, the amount of ethyl alcohol should be between about 0.002 and 0.004 ml per sq cm of crust surface. This results in a weight gain of from about 1% to 2.1% by weight for a typical partially baked pizza crust if the preferred application conditions are utilized. More preferably, sufficient alcohol should be added to produce a weight gain of from about 1.2% to 2.0% by weight, and optimally about 1.6%.

As indicated at 13 in FIG. 1, after treatment of the pizza crusts with alcohol, the crusts are preferably stacked. FIG. 4 illustrates a typical stack 50 containing pizza crusts 20. As shown in FIG. 4, the pizza crusts 20 are placed one on top of the other, so that the alcohol treated face of one crust contacts the alcohol treated face of another crust. Accordingly, the only crust faces not in contact with an alcohol treated surface, are the top and bottom faces of the respective top and bottom crusts in the stack. The stack ordinarily contains between 20 and 24 crusts, but it is apparent that it may contain a smaller or larger amount of crusts.

As illustrated at 14 in FIG. 1, the pizza crusts are finally packaged. The packaging should be performed as soon as possible after the alcohol treatment. Packaging should usually be completed within 10 minutes, and preferably within 5 minutes after the application of the ethyl alcohol. More preferably, packaging takes place within 2 to 3 minutes after alcohol treatment.

Referring to FIG. 6, the partially baked pizza crusts are maintained in the stack while in the package or bag 60. The package may be any packaging material that is resistant to the transmission of air and water vapor such as the low density polymers like polyethylene. The packaging material should be of sufficient thickness to prevent excessive moisture loss or vaporization of the alcohol through the walls of the package. While not necessary, the stack of crusts may be packaged in better packaging materials, such as Saran, which are substantially impervious to air and water vapor.

The top of the package or bag may be sealed or unsealed and may be simply folded as illustrated at 61. If the packages are unsealed, they are preferably folded as shown in FIG. 6 to reduce loss of moisture and alcohol. In any event, it is desirable to maintain substantially constant humidity within the package.

Although hermetically sealed packages are known to reduce spoilage, it is one of the discoveries of the present invention that partially baked pizza crusts prepared in accordance with the process described herein may be kept without loss for as much as 20 weeks while unrefrigerated in unsealed packages which are only resistant to the transmission of air and water vapor.

After packaging, the partially baked pizza crusts are generally shipped to distributors and then to restaurants and pizzerias. At the time of use, the partially baked pizza crusts are coated with a sauce, usually tomato sauce, and topping materials, such as cheese, sausage, pepperoni, and the like deposited thereon, after which they are baked. During baking the ethyl alcohol is at least partially vaporized, which differs from most preservatives which are permanently contained in the pizza crusts. There are no adverse effects from the alcohol that is not vaporized during baking. Ordinarily, however, the remaining alcohol after baking is less than 0.5% by weight of the pizza pie.

While not intending to be bound by any theory, the following is offered as assisting in understanding the invention.

The proper control of the moisture content and, in particular, the Aw by the partial baking step substantially eliminates spoilage by bacteria although it has no substantial retarding effect on the growth of mold and yeast spores. Microorganisms, such as bacteria, can utilize only free water for their metabolic processes, and water which is tightly bound to the molecules in the pizza crusts is not available for their use. The Aw levels utilized in the present invention are generally below the Aw levels required to support the growth of most bacterial strains.

It is believed that the ethyl alcohol, in addition to acting as bacteriacide, reduces the mold growth and spoilage of the partially baked pizza crusts by retarding germination of the viable mold spores which contaminate the surfaces of the partially baked pizza crusts. Apparently, the recontamination of the partially baked crusts with spores following the baking operation is a surface recontamination which is effectively treated by surface application of the ethyl alcohol. It is believed that by stacking the crusts as illustrated and described, a process of vapor pressure equalization of the alcohol occurs at the interface between the contacting sides of the crusts, which tends to permeate the entire stack. The alcohol vapor pressure equalization process, which continues while the stack remains intact, results in fungicidal activity beyond the immediate area of the alcohol application and further results in enhancing fungicidal activity, beyond that which can be accounted for by the small amounts of alcohol deposited thereon in the areas of alcohol deposition.

The inter-contacting alcohol treated surfaces on the faces of the crust in the stack coact to prevent spoilage for long periods of time. Moreover, since the top or first crust in each stack, which is ordinarily also the first crust in the stack to spoil, is used by the restaurant or pizzeria, the useful storage life of the total stack of pizza crusts is prolonged.

The amounts of alcohol used in the invention, while adding to the initial costs of the pizza crusts, is offset by the savings realized in the unrefrigerated storage and reduced spoilage. The amounts of alcohol required to prevent spoilage are remarkably small, and the substantial degree of retardation of mold and yeast growth resulting therefrom, even in unsealed packages at ambient temperatures, is a surprising micro-biological effect.

The invention is further illustrated in the following Examples, which are not intended as limitations on the invention, but as additional exemplifications thereof.

EXAMPLE A

Pizza crusts having a 12-inch diameter were treated according to the process of the invention. In a partial baking step, the moisture content and the Aw level of the crusts were reduced to the acceptable levels. Each crust was then individually sprayed on each flat side and on the edge with 95% undenatured ethyl alcohol. The average amount of ethyl alcohol applied to each crust was 0.0011 ml of alcohol per sq cm of crust surface area or 0.0009 g of alcohol per sq cm of crust surface area. The room temperature was about 96° F. The alcohol was applied to the crusts at different temperatures (measured in the center of a 24-piece stack) prior to spraying, as follows:
1. Eight cases (eight stacks of crusts, each of which contained 24 crusts) were at about room temperature (80° – 100° F) prior to spraying.
2. Eight cases (eight stacks of crusts, each of which contained 24 crusts) were cooled to temperatures in the range from about 60° – 80° F prior to spraying with alcohol.
3. Eight cases (eight stacks of crusts, each of which contained 24 crusts) were cooled to temperatures in the range below 60° F prior to spraying with alcohol.

Crusts untreated with ethyl alcohol were used as a control group. For the control group, three cases (three stacks of crusts, each of which contained 24 crusts) were used.

After spraying with alcohol, the crusts were placed in stacks, as shown in FIG. 5, each of which contains 24 shells. Each stack was placed in an unsealed polyethylene bag, as shown in FIG. 6, and stored at about 70° F.

EXAMPLE B

Pizza crusts having a 12-inch diameter were treated with 95% undenatured ethyl alcohol in the manner described in Example A. The average amount of ethyl alcohol applied to each crust was 0.0017 ml of alcohol per sq cm of crust surface area or 0.0014 g of alcohol per sq cm of crust surface area. The room temperature was about 96° F. The alcohol was applied to the crusts at different temperatures (measured in the center of a 24 piece stack) prior to spraying, as follows:
1. Eight cases (eight stacks of crusts, each of which contained 24 crusts) were at about room temperature (80° – 100° F) prior to spraying.
2. Eight cases (eight stacks of crusts, each of which contained 24 crusts) were cooled to temperatures in the range from about 60° – 80° F prior to spraying with alcohol.
3. Eight cases (eight stacks of crusts, each of which contained 24 crusts) were cooled to temperatures in the range below 60° F prior to spraying with alcohol.

After spraying with alcohol, the crusts were placed in stacks, as shown in FIG. 5, each of which contains 24 shells. Each stack was placed in an unsealed polyethylene bag, as shown in FIG. 6, and stored at about 70° F.

EXAMPLE C

Similarly pizza crusts having a 12-inch diameter were treated with an average amount of ethyl alcohol of about 0.0023 ml of alcohol per sq cm of crust surface area or 0.0018 g of alcohol per sq cm of crust surface area. The room temperature was about 96° F. The alcohol was applied to the crusts at different temperatures (measured in the center of a 24 piece stack) prior to spraying, as follows:
1. Eight cases (eight stacks of crusts, each of which contained 24 crusts) were at about room temperature (80° – 100° F) prior to spraying.
2. Eight cases (eight stacks of crusts, each of which contained 24 crusts) were cooled to temperatures in the range from about 60° – 80° F prior to spraying with alcohol.
3. Eight cases (eight stacks of crusts, each of which contained 24 crusts) were cooled to temperatures in the range below 60° F prior to spraying with alcohol.

After spraying with alcohol, the crusts were placed in stacks, as shown in FIG. 5, each of which contains 24 shells. Each stack was placed in an unsealed polyethylene bag, as shown in FIG. 6, and stored at about 70° F.

EXAMPLE D

In a manner similar to that described in Examples A-C above, pizza crusts having a 12-inch diameter were treated with an average amount of ethyl alcohol of about 0.0028 ml of alcohol per sq cm of crust surface area or 0.0023 g of alcohol per sq cm of crust surface area. The room temperature was 96° F. The alcohol was applied to the crusts at different temperatures (measured in the center of a 24 piece stack) prior to spraying, as follows:

1. Eight cases (eight stacks of crusts, each of which contained 24 crusts) were at about room temperature (80° - 100° F) prior to spraying.
2. Eight cases (eight stacks of crusts, each of which contained 24 crusts) were cooled to temperatures in the range from about 60° - 80° F prior to spraying with alcohol.
3. Eight cases (eight stacks of crusts, each of which contained 24 crusts) were cooled to temperatures in the range below 60° F prior to spraying with alcohol.

After spraying with alcohol, the crusts were placed in stacks, as shown in FIG. 5, each of which contains 24 shells. Each stack was placed in an unsealed polyethylene bag, as shown in FIG. 4, and stored at about 70° F.

The pizza crusts of Examples A to D above were examined for mold and yeast growth at intervals of two weeks over a period of time. The average storage temperature for the crusts treated in Examples A to D was about 70° F. After two weeks, the untreated crusts (3 cases) of the control group stored at room temperature were moldy.

The treated crusts in Example A above, which were at temperatures about 96° F and at 60° - 80° F at the time of the alcohol application, Examples A-1 and A-2 above, were moldy at the end of six weeks. The results are tabulated below together with the results of the other Examples.

| Ex. | Amt of Alcohol (ml/cm²) | Weight of Alcohol | Temp. of Crust When Sprayed (° F.) | First Mold Noticed (weeks) |
| --- | --- | --- | --- | --- |
| Control | Nil | — | — | 2 |
| A-1 | 0.0011 | 0.54% | room (80° -100°) | 6 |
| A-2 | 0.0011 | 0.54% | 60°-80° | 6 |
| A-3 | 0.0011 | 0.54% | below 60° | 12 |
| B-1 | 0.0017 | 0.83% | room (80°-100°) | 16 |
| B-2 | 0.0017 | 0.83% | 60°-80° | 16 |
| B-3 | 0.0017 | 0.83% | below 60° | 16 |
| C-1 | 0.0023 | 1.128% | room (80°-100°) | 16 |
| C-2 | 0.0023 | 1.128% | 60°-80° | 16 |
| C-3 | 0.0023 | 1.128% | below 60° | 18 |
| D-1 | 0.0028 | 1.37% | room (80°-100°) | more than 20 |
| D-2 | 0.0028 | 1.37% | 60°-80° | 16 |
| D-3 | 0.0028 | 1.37% | below 60° | more than 20 |

The mold and yeast growth in the tests was first observed on the top and bottom faces of the top and bottom pizza crusts, respectively, in the stack. The mold and yeast growth next appeared on the edges of the pizza crusts in the stack. It is apparent, therefore, that the contacting alcohol-treated faces of the crusts coact with each other in reducing spoilage in the stack.

EXAMPLE E

In a similar manner, pizza crusts were partially baked to an average moisture content of about 32% and an Aw of about 0.94-0.945 using a final temperature between 500° F and 550° F for from 3 to 4 minutes. The temperature of the crusts was then reduced to between 68° F and 72° F and the crusts were sprayed with ethyl alcohol having a temperature of about 75° F - 80° F. Sufficient alcohol was applied to result in an average weight increase of about 1.7% by weight. The crusts were then stacked 24 high and packaged in polyethylene bags as illustrated in FIG. 6. The packaged crusts were stored at 70° F and sampled for possible mold spoilage at two week intervals. After 20 weeks, no spoilage had occurred.

In the drawing and specification, there has been set forth preferred embodiments of the invention, and although specific terms are employed, these are used in a generic and descriptive sense only, and not for the purpose of limitation. Changes in form and proportion of parts, as well as substitution of equivalents are contemplated, as circumstances may suggest or render expedient, without departing from the spirit or scope of this invention, as further defined in the following claims.

We claim:

1. An apparatus for preparing partially baked pizza crusts having an improved shelf life and resistance to the growth of viable mold spores, which comprises:
   (a) means for partially baking formed pizza crusts to reduce the moisture content of the pizza crusts to between 25% and 50% by weight and to reduce the water activity of the crusts to not greater than 0.96;
   (b) a cooling chamber for cooling the partially baked pizza crusts to a temperature below ambient having a spiral path conveyor means for transporting the partially baked pizza crusts vertically through the chamber and a means for passing cooled air over the crusts as they are transported through the chamber; and
   (c) ethyl alcohol treating means comprising a mesh conveyor belt and opposed spray nozzles for directing a mist of ethyl alcohol at the entire top and bottom surfaces of the cooled crusts as they move along the mesh conveyor belt.

2. An apparatus for treating baked products in order to improve their shelf life and resistance to growth of viable mold spores, which comprises:
   means for baking the product to reduce the moisture content to between about 25% and 50% by weight and to reduce the water activity to not greater than about 0.96;
   a cooling chamber for cooling the partially baked pizza crusts to a temperature below ambient having a spiral path conveyor means for transporting the partially baked product vertically through the chamber and a means for passing cooling air over the product as it is transported through the chamber; and
   ethyl alcohol treating means including an open mesh conveyor belt and spray nozzles for directing a mist of ethyl alcohol at the surfaces of the cooled product as it moves along said open mesh conveyor belt.

3. An apparatus for treating baked produced, so as to provide an improved shelf life, and which is adapted to treat pizza crusts, which comprises:
   heating means for baking the product to reduce the moisture content of said product to between about 25% and 50% by weight and to reduce the water activity of said product to not greater than about 0.96;
   a forced air cooling chamber for reducing the temperature of the baked product to a point below ambient temperatures, said chamber having a convoluted conveyor means for transporting the baked product vertically through the chamber; and spray means for coating substantially the entire surface of the cooked, baked product with from about 0.001 to 0.02 ml of ethyl alcohol per sq. cm of surface.

4. An apparatus for treating baked products, so as to provide an improved shelf life, and which is adapted to treat pizza crusts, which comprises:

heating means for baking the product to reduce the moisture content of said product to between about 25% and 50% by weight and to reduce the water activity of said product to not greater than about 0.96;

cooling means for reducing the temperature of the baked product to a point below ambient temperatures; and spray means for coating substantially the entire surface of the cooled, baked product with from about 0.001 to 0.02 ml of ethyl alcohol per sq. cm of surface, said spray means including an open mesh conveyor belt and spray means for directing alcohol sprays at the surfaces of the product as it moves along the conveyor.

* * * * *